United States Patent [19]

Haas et al.

[11] Patent Number: 5,023,280
[45] Date of Patent: Jun. 11, 1991

[54] PROCESS FOR THE PRODUCTION OF POLYURETHANE FOAMS

[75] Inventors: Peter Haas, Haan; Hans Hettel, Roesrath, both of Fed. Rep. of Germany

[73] Assignee: Bayer Aktiengesellschaft, Bayerwerk, Fed. Rep. of Germany

[21] Appl. No.: 335,071

[22] Filed: Apr. 7, 1989

[30] Foreign Application Priority Data

Apr. 14, 1988 [DE] Fed. Rep. of Germany ....... 3812348

[51] Int. Cl.$^5$ ............................ C08J 9/14; C08K 9/02
[52] U.S. Cl. ...................................... 521/106; 521/99; 521/119; 521/120; 521/123; 521/128
[58] Field of Search ................. 521/99, 106, 119, 120, 521/123, 128

[56] References Cited

U.S. PATENT DOCUMENTS

| 3,574,644 | 4/1971 | Olstowski et al. | 106/16 |
|---|---|---|---|
| 4,529,742 | 7/1985 | Von Bonin et al. | 521/107 |
| 4,729,853 | 3/1988 | Von Bonin | 521/907 |
| 4,826,884 | 5/1989 | Grace et al. | 521/128 |
| 4,977,194 | 12/1990 | Haas et al. | 521/106 |

FOREIGN PATENT DOCUMENTS 2428307 8/1976 Fed. Rep. of Germany .

Primary Examiner—John Kight, III
Assistant Examiner—Kathryne Elaine Shelborne
Attorney, Agent, or Firm—Joseph C. Gil; Richard E. L. Henderson

[57] ABSTRACT

The present invention relates to a process for the production of polyurethane foams by the reaction of 1) polyisocyanates with 2) polyesters, polycarbonates, polylactones, or polyamides having a molecular weight range of about 400 to about 10,000 and containing at least two isocyanate reactive hydrogen atoms, or mixtures thereof, in the presence of 3) water and/or organic blowing agents, 4) catalysts and 5) flame-retardants, and optionally in the presence of 6) compounds with molecular weights of from 32 to 399 containing at least two isocyanate reactive hydrogen atoms and 7) surface-active additives and other auxiliary agents known in the art. The flame-retardants consist of graphite which has been modified with inorganic expandable materials, either alone or in combination with an inorganic co-flame-retardant.

15 Claims, No Drawings

PROCESS FOR THE PRODUCTION OF POLYURETHANE FOAMS

BACKGROUND OF THE INVENTION

Imparting flame-resistance to polyurethane foams based on polyether polyols and polyester polyols has been a long-sought goal. Various phosphoric acid esters or metal oxides may be used for this purpose. In GB-A 2,168,706, expandable graphite is proposed as a flame-retardant for polyurethane ("PUR") ether foams. Such use of expandable graphite was found, however, to have the following disadvantages:
- powerful wick action by the graphite component which causes burning to continue,
- heavy formation of fly ash and the formation of soot which in part continues to glow, and
- formation of finely powdered cinder which is very easily dissipated.

It was surprisingly found that when expandable graphite was used as flame retardant in PUR ester foams, the above disadvantages, which prevent the use of this flame retardant for technical processes, do not occur.

In a comparison test, ester foams according to this invention were used instead of the ether foams described in GB-A 2,168,706. Exposure of these ester foams to flames produces the following results, both when expanded graphite is used alone and especially when it is used in combination with inorganic flame retardant additives:
- no wick action due to the addition of graphite,
- no formation of fly ash, and
- no powdery combustion residue.

Instead, a heavily carbonizing, self-extinguishing, nondripping foam is obtained. This result is confirmed by numerous conventional standard tests for flame retardants, such as BS 5852, Part 2, Crib 5 test; DIN 4102; MVSS; and UL 94.

SUMMARY OF THE INVENTION

The present invention relates to a process for the production of polyurethane foams by the reaction of 1) polyisocyanates with 2) polyesters, polycarbonates, polylactones, or polyamides having a molecular weight range of about 400 to about 10,000 and containing at least two isocyanate reactive hydrogen atoms, or mixtures thereof, in the presence of 3) water and/or organic blowing agents, 4) catalysts and 5) flame-retardants, and optionally in the presence of 6) compounds with molecular weights of from 32 to 399 containing at least two isocyanate reactive hydrogen atoms and 7) surface-active additives and other auxiliary agents known in the art. The substances used as flame-retardants 5) include
   a) from 1 to 30 parts by weight, based on component 2), preferably 1 to 20 parts by weight and most preferably 2.5 to 15 parts by weight, of graphite which has been modified with inorganic expandable materials, wherein said expandable graphite is used either alone or, preferably, in combination with
   b) from 1 to 30 parts by weight, based on component 2), preferably from 1 to 25 parts by weight and most preferably from 2.5 to 20 parts by weight, of an inorganic co-flame-retardant.

Preferred embodiments of the process according to the invention are characterized by use of
   a sulfate-containing expandable graphite having a sulfate content of from 1 to 40%, preferably from 1 to 30%, most preferably from 5 to 20%,
   ammonium polyphosphate as co-flame-retardant,
   calcium cyanamide as a co-flame-retardant,
   aluminum hydroxide as a co-flame-retardant, and
   calcium carbonate as a co-flame-retardant.

DESCRIPTION OF THE INVENTION

The examples given in GB-A 2,168,706 all exhibit the serious disadvantage of a powerful wick action by the expandable graphite component, combined with continued burning and the formation of a completely unbound very fine ash residue. On the other hand, the PUR ester foams prepared according to the present invention were surprisingly readily carbonized, coherent, flame-resistant, difficult to ignite, and self-extinguishing, especially when inorganic additives containing phosphorus were used. A further advantage is that the combination according to the invention required only a small quantity of active ingredient to produce effective flame-resistance. It has hitherto been necessary to use 30 parts by weight of the individual components.

The following starting components are used for the preparation of the polyurethane ester foams:

1. Aliphatic, cycloaliphatic, araliphatic, aromatic, and heterocyclic polyisocyanates as described, for example, by W. Siefken in *Justus Liebigs Annalen der Chemie*, 562, pages 75 to 136; for example, those corresponding to the following formula:

wherein
   n is 2 to 4, preferably 2, and
   Q is an aliphatic hydrocarbon group with 2 to 18, preferably 6 to 10, carbon atoms; a cycloaliphatic hydrocarbon group with 4 to 15, preferably 5 to 10, carbon atoms; an aromatic hydrocarbon group with 6 to 15, preferably 6 to 13, carbon atoms; or an araliphatic hydrocarbon group with 8 to 15, preferably 8 to 13, carbon atoms, such as the polyisocyanates described on pages 10 to 11 of DE-OS 2,832,253.

As a rule, it is particularly preferred to use commercially available polyisocyanates such as 2,4- and 2,6-tolylene diisocyanate and any mixtures of these isomers ("TDI"); polyphenyl-polymethylene polyisocyanates which may be prepared by anilineformaldehyde condensation followed by phosgenation ("crude MDI"); and polyisocyanates containing carbodiimide groups, urethane groups, allophanate groups, isocyanurate groups, urea groups or biuret groups ("modified polyisocyanates"), especially those modified polyisocyanates which are derived from 2,4- and/or 2,6-tolylene diisocyanates or from 4,4'- and/or 2,4'-diphenylmethane diisocyanate.

2. Polyesters, polycarbonates, polylactones, and polyamides containing at least two isocyanate reactive hydrogen atoms and generally having a molecular weight of from about 400 to about 10,000. Such materials include not only compounds containing amino groups, thiol groups, or carboxyl groups but also especially compounds containing hydroxyl groups. Such materials include, in particular, compounds in the molecular weight range of from about 1000 to about 8000, preferably from 2000 to 4000, containing from 2 to 8 hydroxyl groups, for example, compounds of this type containing at least 2, generally 2 to 8, and preferably 2 to 4, hydroxyl groups, of the type known in the art for the production of both homogeneous and cellular polyurethanes and described, e.g., in DE-OS 2,832,253, pages 11 to 18.

A certain proportion (up to 50% by weight, based on the polyesters, polycarbonates, polylactones and polyamides) of polyethers having a molecular weight range of from about 400 to about 10,000 and containing at least two hydroxyl groups may also be used.

3. Water (preferably) and/or readily volatile organic substances as blowing agents.

4. Catalysts known in the art, such as tertiary amines and/or organometallic compounds.

5. Expandable graphite as a flame retardant, either alone or, preferably, with the addition of an inorganic co-flame-retardant.

Expandable graphite is a modified graphite prepared according to methods known in the art so as to expand upon exposure to flame or heat. For the purpose of this invention, it is preferred to use those types of graphite which have been modified with sulfuric acid. Such compositions generally contain about 5 to 20% by weight of bound sulfate, depending on the method employed for their preparation. Nitrate and fluoride, for example, may also be used as the expanding component in the graphite structure.

Co-flame-retardants are substances which enhance the flame retarding properties of the expandable graphite flame retardant. Suitable co-flame-retardants include ammonium polyphosphates with various degrees of condensation, oligophosphates containing various cationic components, calcium cyanamide, lime, aluminum oxides, aluminum hydrates, aluminum hydroxides, and boron oxides. Components with a high nitrogen content, such as urea, melamine, melamine derivatives, melamine salts, cyanamide and dicyandiamide may also be used.

6. Optionally, compounds in the molecular weight range of from about 32 to about 399 containing at least two isocyanate reactive hydrogen atoms as chain lengthening agents or cross-linking agents. Such compounds contain hydroxyl groups, amino groups, thiol groups, carboxyl groups, or a combination thereof, preferably hydroxyl groups and/or amino groups, and generally have from 2 to 8, preferably from 2 to 4, isocyanate reactive hydrogen atoms. Examples are described in DE-OS 2,832,253, pages 19 to 20.

7. Optionally, surface-active additives such as emulsifiers and foam stabilizers.

Among the emulsifiers, those based on alkoxylated fatty acids and higher alcohols are preferred.

Suitable foam stabilizers are especially the polyether siloxanes, particularly those which are water-soluble, and generally consist of a copolymer of ethylene oxide and propylene oxide to which a polydimethylsiloxane group is attached. Foam stabilizers of this type are described, e.g., in U.S. Pat. Nos. 2,834,748, 2,917,480 and 3,629,308.

Various types of additives which may also be used include reaction retarders, e.g., substances which are acidic in the reaction, such as hydrochloric acid or organic acid halides; cell regulators of known type, such as paraffins or fatty alcohols or dimethylpolysiloxanes; pigments; dyes; stabilizers against aging and weathering; plasticizers; fungistatic and bacteriostatic substances; and fillers, such as barium sulfate, kieselguhr, carbon black or whiting.

Other examples of additives optionally used according to the invention, such as surface-active additives and foam stabilizers, cell regulators, reaction retarders, stabilizers, flame retardants, plasticizers, dyes, fillers, and fungistatic and bacteriostatic substances, as well as details concerning the use and mode of action of these additives, are described in Kunststoff-Handbuch, Volume VII, published by Vieweg and Höchtlen, Carl-Hanser-Verlag, Munich 1966, e.g., on pages 103 to 113.

The components are reacted together by the known one-shot process, the prepolymer process, or the semi-prepolymer process, often using mechanical apparatus such as described, e.g., in U.S. Pat. No. 2,764,565. Details concerning processing apparatus that may also be used according to the invention are given in Kunststoff-Handbuch, Volume VII, published by Vieweg and Höchtlen, Carl-Hanser-Verlag, Munich 1966, e.g., on pages 121 to 205.

The foaming process according to the invention for the production of the foams may be carried out inside closed molds. The reaction mixture is introduced into a mold which may be made of a metal such as aluminum or a plastics material such as an epoxide resin. The foamable reaction mixture then foams up in the mold to form the molded product. Foaming in the mold may be carried out in such a manner that the molded part produced has a cellular structure on its surface but may also be carried out to produce a molded part with a non-cellular skin and a cellular core. The desired result according to the invention may be obtained either by introducing just enough foamable reaction mixture into the mold to fill the mold with foam or by introducing a larger quantity of reaction mixture than is required for filling the mold with foam. The latter procedure is known as overcharging and has been disclosed, for example, in U.S. Pat. Nos. 3,178,490 and 3,182,104.

Foaming inside molds is frequently carried out with known "external mold release agents" such as silicone oils but may also be carried out with so-called "internal mold release agents," optionally together with external mold release agents, such as disclosed in DE-OS 2,121,670 and 2,307,589.

Foams may, of course, also be produced by block foaming or by the known laminator process.

The products obtainable according to the invention are employed when enhanced flame resistance for polyurethane foams is required. Such foams can be used, for example, in the building industry, as coating materials with increased flame resistance, for insulating the engine area in trucks and passenger cars, and for insulating the surfaces of engine hoods to reduce noise.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all quantities given in parts are parts by weight.

DESCRIPTION OF THE PREFERRED EMBODIMENTS

In each of the following examples, the listed components were reacted together under the conditions conventionally employed for the production of polyester polyurethane/urea foams.

EXAMPLE 1

100 parts of an ester polyol with OH number 60 based on adipic acid, diethylene glycol, trimethylolpropane (Desmophen ® 2200 of Bayer AG)
 3.0 parts water
 1.0 part amine catalyst (Desmorapid ® DB of Bayer AG)
 1.5 parts stabilizer (SE 232 of BP)
 5.0 parts expandable graphite (GHS 3 of Sigri GmbH, Meitingen)
 5.0 parts Exolit 422 (ammonium polyphosphate) of Hoechst AG (co-flame retardant)
 38.0 parts of a 1:1 mixture of 80% by weight of 2,4- and 20% by weight of 2,6-tolylene diisocyanate and 65% by weight of 2,4- and 35% by weight of 2,6-tolylene diisocyanate Gross density: 54 kg/m$^3$ The following tests for flame resistance were carried out on the resultant PUR ester foam. The results are given according to the gradings used in each standard.
 BS 5852, Part 2, Crib 5: passed; burning time 4 minutes, crib broken in by about 4 cm
 UL 94: HF-1
 DIN 4102: Building material Class B3
 MVSS (Docket 3.3): passed

EXAMPLE 2

100 parts of an ester polyol with OH number 60 based on adipic acid, diethylene glycol and trimethylolpropane (Desmophen ® 2200 of Bayer AG)
 3 parts water
 1.0 part amine catalyst (Desmorapid ® DB of Bayer AG)
 1.5 part stabilizer (SE 232 of BP)
 10 parts expandable graphite (GHS 3 of Sigri GmbH, Meitingen)
 10 parts Exolit 422 of Hoechst AG (co-flame retardant)
 38 parts of a 1:1 mixture of 80% by weight of 2,4- and 20% by weight of 2,6-tolylene diisocyanate and 65% by weight of 2,4- and 35% by weight of 2,6-tolylene diisocyanate Gross density: 55 kg/m$^3$ The following tests for flame resistance were carried out on the resultant PUR ester foam.
 BS 5852, Part 2, Crib 5: passed; burning time 3.5 minutes, crib broken in by about 3 cm
 UL 94: HF-1
 DIN 4102: Building material Class B2
 MVSS (Docket 3.3): passed

EXAMPLE 3

100 parts of an ester polyol with OH number 60 based on adipic acid, diethylene glycol and trimethylolpropane (Desmophen ® 2200 of Bayer AG)
 3 parts water
 1.0 part amine catalyst (Desmorapid ® DB of Bayer AG)
 1.5 parts stabilizer (SE 232 of BP)
 5 parts expandable graphite (GHS 3 of Sigri GmbH, Meitingen)
 10 parts Exolit 422 of Hoechst AG (co-flame retardant)
 38 parts of a 1:1 mixture of 80% by weight of 2,4- and 20% by weight of 2,6-tolylene diisocyanate and 65% by weight of 2,4- and 35% by weight of 2,6-tolylenediisocyanate Gross density: 59 kg/m$^3$ The following tests for flame resistance were carried out on the resultant PUR ester foam.
 BS 5852, Part 2, Crib 5: passed; burning time 3.5 minutes, crib broken in by about 3 cm
 DIN 4102: Building material Class B 2
 UL 94: HBF
 MVSS (Docket 3.3): passed

EXAMPLE 4

100 parts of an ester polyol with OH number 60 based on adipic acid, diethyleneglycol and trimethylolpropane (Desmophen ® 2200 of Bayer AG)
 3 parts water
 1.0 part amine catalyst (Desmorapid ® NMM of Bayer AG)
 0.9 parts emulsifier (EM of Bayer AG)
 10 parts expandable graphite (GHS 3 of Sigri GmbH, Meitingen)
 10 parts Martinal (aluminum oxide trihydrate) of Martinswerk, Bergheim (co-flame retardant)
 38 parts of a 1:1 mixture of 80% by weight of 2,4- and 20% by weight of 2,6-tolylene diisocyanate and 65% by weight of 2,4- and 35% by weight of 2,6-tolylene diisocyanate Gross density: 58 kg/m$^3$ The following tests for flame resistance were carried out on the resultant PUR ester foam.
 BS 5852, Part 2, Crib 5: passed; burning time 5 minutes, crib caved in by about 5 cm
 DIN 4102: Building material Class B2

EXAMPLE 5

100 parts of an ester polyol with OH number 60 based on adipic acid, diethylene glycol and trimethylolpropane (Desmophen ® 2200 of Bayer AG)
 3 parts water
 1.0 part amine catalyst (Desmorapid ® NMM of Bayer AG)
 0.9 parts emulsifier (EM of Bayer AG)
 10 parts expandable graphite (GHS 3 of Sigri GmbH, Meitingen)
 10 parts whiting
 38 parts of a 1:1 mixture of 80% by weight of 2,4- and 20% by weight of 2,6-tolylene diisocyanate and 65% by weight of 2,4- and 35% by weight of 2,6-tolylene diisocyanate Gross density: 57 kg/m$^3$ The following tests for flame resistance were carried out on the resultant PUR ester foam.
 UL 94: HBF
 DIN 4102: Building material Class B2
 MVSS (Docket 3.3): passed

EXAMPLE 6

100 parts of an ester polyol with OH number 60 based on adipic acid, diethylene glycol and trimethylolpropane (Desmophen ® 2200 of Bayer AG)
 3 parts water
 1.0 part amine catalyst (Desmorapid ® NMM of Bayer AG)
 0.9 parts emulsifier (EM of Bayer AG)
 10 parts expandable graphite (GHS 3 of Sigri GmbH, Meitingen)
 10 parts calcium cyanamide
 38 parts of a 1:1 mixture of 80% by weight of 2,4- and 20% by weight of 2,6-tolylene diisocyanate and 65% by weight of 2,4- and 35% by weight of 2,6-tolylene diisocyanate Gross density: 56 kg/m$^3$ The following tests for flame resistance were carried out on the resultant PUR ester foam.
 UL 94: HF-1
 DIN 4102: Building material Class B3

EXAMPLE 7

100 parts of an ester polyol with OH number 60 based on adipic acid, diethylene glycol and trimethylolpropane (Desmophen ® 2200 of Bayer AG)
3 parts water
1 part amine activator (Desmorapid ® DB of Bayer AG)
1.5 parts stabilizer (SE 232 of BP)
10 parts expandable graphite (GHS 3 of Sigri GmbH, Meitingen)
38 parts of a 1:1 mixture of 80% by weight of 2,4- and 20% by weight of 2,6-tolylene diisocyanate and 65% by weight of 2,4- and 35% by weight of 2,6-tolylene diisocyanate Gross density: 53 kg/m$^3$ The following tests for flame resistance were carried out on the resultant PUR ester foam.
BS 5852, Part 2, Crib 5: passed; burning time 5.5 minutes, crib broken in by about 5 cm
DIN 5102: Building material Class B3
MVSS (Docket 3.3): passed

EXAMPLE 8

100 parts of an ester polyol with OH number 60 based on adipic acid, diethylene glycol and trimethylolpropane
3 parts water
1 part amine activator (Desmorapid ® DB of Bayer AG)
1.5 part stabilizer (SE 232 of BP)
20 parts of expandable graphite (GHS 3 of Sigri GmbH, Meitingen)
38 parts of 1:1 mixture of 80% by weight of 2,4- and 20% by weight of 2,6-tolylene diisocyanate and 65% by weight of 2,4- and 35% by weight of 2,6-tolylene diisocyanate Gross density: 55 kg/m$^3$ The following tests for flame resistance were carried out on the resultant PUR ester foam.
BS 5852, Part 2, Crib 5: passed; burning time 4 minutes, crib broken in by about 3 cm.
DIN 5120: Building material Class B2

What is claimed is:

1. A process for the production of polyurethane foams comprising reacting
   (1) a polyisocyanate with
   (2) a polyester, polycarbonate, polylactone, or polyamide having a molecular weight of from about 400 to about 10,000 and containing at least two isocyanate reactive hydrogen atoms, or a mixture thereof,
   in the presence of
   (3) water, an organic blowing agent, or a mixture thereof,
   (4) a catalyst, and
   (5) a flame retardant comprising from about 1 to about 30 parts by weight, based on component (2), of a graphite modified with an inorganic expandable material.

2. A process according to claim 1 additionally containing
   (6) a compound having a molecular weight of from 32 to 399 and containing at least two isocyanate reactive hydrogen atoms.

3. A process according to claim 1 additionally containing
   (7) a surface-active additive, other auxiliary agents, or a mixture thereof.

4. A process according to claim 1 for the production of polyurethane foams comprising reacting
   (1) a polyisocyanate with
   (2) a polyester, polycarbonate, polylactone, or polyamide having a molecular weight of from about 400 to about 10,000 and containing at least two isocyanate reactive hydrogen atoms, or a mixture thereof,
   in the presence of
   (3) water, an organic blowing agent, or a mixture thereof,
   (4) a catalyst,
   (5) a flame retardant comprising from about 1 to about 30 parts by weight, based on component (2), of a graphite modified with an inorganic expandable material,
   (6) a compound having a molecular weight of from 32 to 399 and containing at least two isocyanate reactive hydrogen atoms, and
   (7) a surface-active additive, other auxiliary agents, or a mixture thereof.

5. A process according to claim 1 wherein from about 1 to about 20 parts by weight of a graphite modified with an inorganic expandable material is used.

6. A process according to claim 1 wherein from about 2.5 to about 15 parts by weight of a graphite modified with an inorganic expandable material is used.

7. A process according to claim 1 wherein the flame retardant comprises
   (a) from about 1 to about 30 parts by weight, based on component (2), of a graphite modified with an inorganic expandable material, and
   (b) from about 1 to about 30 parts by weight, based on component (2), of an inorganic co-flame-retardant.

8. A process according to claim 7 wherein from about 1 to about 25 parts by weight of the inorganic co-flame-retardant is used.

9. A process according to claim 7 wherein from about 2.5 to about 20 parts by weight of the inorganic co-flame-retardant is used.

10. A process according to claim 7 wherein the inorganic co-flame-retardant is selected from the group consisting of ammonium polyphosphate, calcium cyanamide, aluminum hydroxide, and calcium carbonate.

11. A process according to claim 1 wherein the modified graphite is a sulfate-containing expandable graphite having a sulfate content of from about 1 to about 40% by weight.

12. A process according to claim 1 wherein the modified graphite is a sulfate-containing expandable graphite having a sulfate content of from about 1 to about 30% by weight.

13. A process according to claim 1 wherein the modified graphite is a sulfate-containing expandable graphite having a sulfate content of from about 5 to about 20% by weight.

14. A process according to claim 1 for the production of polyurethane foams comprising reacting
   (1) a polyisocyanate with
   (2) a polyester, polycarbonate, polylactone, or polyamide having a molecular weight of from about 400 to about 10,000 and containing at least two isocyanate reactive hydrogen atoms, or a mixture thereof,
   in the presence of
   (3) water, an organic blowing agent, or a mixture thereof,
   (4) a catalyst, and (5) a flame retardant comprising,
  (a) from about 1 to about 30 parts by weight, based on component (2), of a sulfate-containing expandable graphite having a sulfate content of from about 5 to about 20% by weight, and
  (b) from about 1 to about 30 parts by weight, based on component (2), of an inorganic co-flame-retardant selected from the group consisting of ammonium polyphosphate, calcium cyanamide, aluminum hydroxide, and calcium carbonate.

15. A process according to claim 1 for the production of polyurethane foams comprising reacting
(1) a polyisocyanate with
(2) a polyester, polycarbonate, polylactone, or polyamide having a molecular weight of from about 400 to about 10,000 and containing at least two isocyanate reactive hydrogen atoms, or a mixture thereof,
in the presence of
(3) water, an organic blowing agent, or a mixture thereof,
(4) a catalyst,
(5) a flame retardant comprising,
  (a) from about 1 to about 30 parts by weight, based on component (2), of a sulfate-containing expandable graphite having a sulfate content of from about 5 to about 20% by weight,
  (b) from about 1 to about 30 parts by weight, based on component (2), of an inorganic co-flame-retardant selected from the group consisting of ammonium polyphosphate, calcium cyanamide, aluminum hydroxide, and calcium carbonate.
(6) a compound having a molecular weight of from 32 to 399 and containing at least two isocyanate reactive hydrogen atoms, and
(7) a surface-active additive, other auxiliary agents, or a mixture thereof.

* * * * *